(12) United States Patent
Boyer et al.

(10) Patent No.: US 8,086,644 B2
(45) Date of Patent: Dec. 27, 2011

(54) SIMPLIFYING COMPLEX DATA STREAM PROBLEMS INVOLVING FEATURE EXTRACTION FROM NOISY DATA

(75) Inventors: Stephen K. Boyer, San Jose, CA (US); Kenneth M. Johns, Riverview, FL (US); Jeffrey T. Kreulen, San Jose, CA (US); James J. Rhodes, Los Gatos, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/171,053

(22) Filed: Jul. 10, 2008

(65) Prior Publication Data

US 2010/0011192 A1    Jan. 14, 2010

(51) Int. Cl.
*G06F 17/00* (2006.01)
(52) U.S. Cl. .................................. 707/802; 707/803
(58) Field of Classification Search .............. 707/736, 707/802, 803
See application file for complete search history.

(56) References Cited

U.S. PATENT DOCUMENTS

| | | | |
|---|---|---|---|
| 7,630,982 B2 | 12/2009 | Boyce | |
| 2001/0003166 A1* | 6/2001 | Gulick | 700/94 |
| 2001/0038642 A1* | 11/2001 | Alvarez et al. | 370/477 |
| 2002/0165912 A1* | 11/2002 | Wenocur et al. | 709/203 |
| 2002/0178360 A1* | 11/2002 | Wenocur et al. | 713/170 |
| 2002/0196935 A1* | 12/2002 | Wenocur et al. | 380/37 |
| 2003/0093384 A1* | 5/2003 | Durst et al. | 705/64 |
| 2006/0053133 A1 | 3/2006 | Parkinson | |
| 2008/0005158 A1 | 1/2008 | Zartler et al. | |
| 2008/0126812 A1* | 5/2008 | Ahmed et al. | 713/189 |

OTHER PUBLICATIONS

Wikipedia Web Definition, "End-of-Transmission Character", Feb. 26, 2011 (citing a 1996 definition from Federal Standard), Publisher: Wikipedia, p. 1.*
Beringer et al., "Online clustering of paralleldata streams", Data & Knowledge Engineering, vol. 58, Issue 2, Aug. 2006, pp. 180-204.
Maglio et al., "LiveInfo: Adapting Web Experience by Customization and Annotation", Lecture Notes in Computer Science Adaptive vol. 1892/2000: Hypermedia and Adaptive Web-Based Systems, pp. 144-154, 2000, Springer Berlin/Heidelberg.

* cited by examiner

*Primary Examiner* — Mohammad Ali
*Assistant Examiner* — John Hocker
(74) *Attorney, Agent, or Firm* — Cantor Colburn LLP

(57) ABSTRACT

Methods, systems and computer program products for simplifying complex data stream problems involving feature extraction from noisy data. Exemplary embodiments include a method for processing a data stream, including applying multiple operators to the data stream, wherein an operation by each of the multiple operators includes retrieving the next chunk for each of set of input parameters, performing digital processing operations on a respective next chunk, producing sets of output parameters and adding data to one or more internal data stores, each internal data store acting as a data stream source.

1 Claim, 3 Drawing Sheets

SIMPLIFYING COMPLEX DATA STREAM PROBLEMS INVOLVING FEATURE EXTRACTION FROM NOISY DATA

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field

This invention relates to complex data streams, and particularly to methods, systems and computer program products for simplifying complex data stream problems involving feature extraction from noisy data.

2. Description of Background

Currently, stored data is growing at an incredible rate with the majority of the data being stored as unstructured information. This data may contain complex entities of interest such as chemical, gene, protein, bio, nano diagrams, sketches or pictures, contained in data streams. Currently, it is difficult for a machine to efficiently and accurately extract and analyze structures from data streams using existing implemented techniques. It is also extremely difficult to maintain the software required using conventional techniques.

The state of the art is to implement techniques such as neuro-linguistic programming (NLP) and conditional random field (CRF) to allow computers to understand unstructured data. These 'clean' data techniques (such as NLP and CRF) are only successful if the majority of the data is uniform and well formatted. Unfortunately, real data is 'noisy' and requires extra effort to remove the noise. A noisy data stream presents a significant challenge to typical stream processing technology which expects to process the data presented in a sequential way, recognizing and annotating or extracting structures on-the-fly. In particular, it is difficult to recognize a structure of unpredictable length using a set of sequentially applied transformations that may destroy the structure in order to clean up noise. The alternative of concurrent data stream processing is complex and typically expensive to maintain.

BRIEF SUMMARY

Exemplary embodiments include a method for processing a data stream, including applying multiple operators to the data stream, at least one of the operators taking as input a plurality of sets of input parameters, each set of input parameters including an input data stream pointer pointing to a data stream source and information about how to process the data stream, and each operator producing as output at least one set of output parameters, each set of output parameters including an output data stream pointer pointing to a data stream source and information about how to process the data stream, wherein each set of input parameters and each set of output parameters includes a fixed positive window size and a non-negative amount to slide the window from a last position, the window and slide parameters defining a next chunk of data to be processed from a respective data stream, wherein an operation by each of the multiple operators includes retrieving the next chunk for each of set of input parameters, performing digital processing operations on a respective next chunk, producing sets of output parameters and adding data to one or more internal data stores, each internal data store acting as a data stream source, wherein there is one original and one final operator, the original operator having a fixed set of input parameters with the pointer pointing to an original data stream source, and the final operator having only one set of output parameters and the output data stream pointer pointing to an internal data store to which the final operator adds data, wherein the internal data store of the final operator holds a stream of annotations corresponding to the original data stream.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which solves the general problem of data stream processing in which multiple operators are to be employed in ways that are contingent on the content of the data stream.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
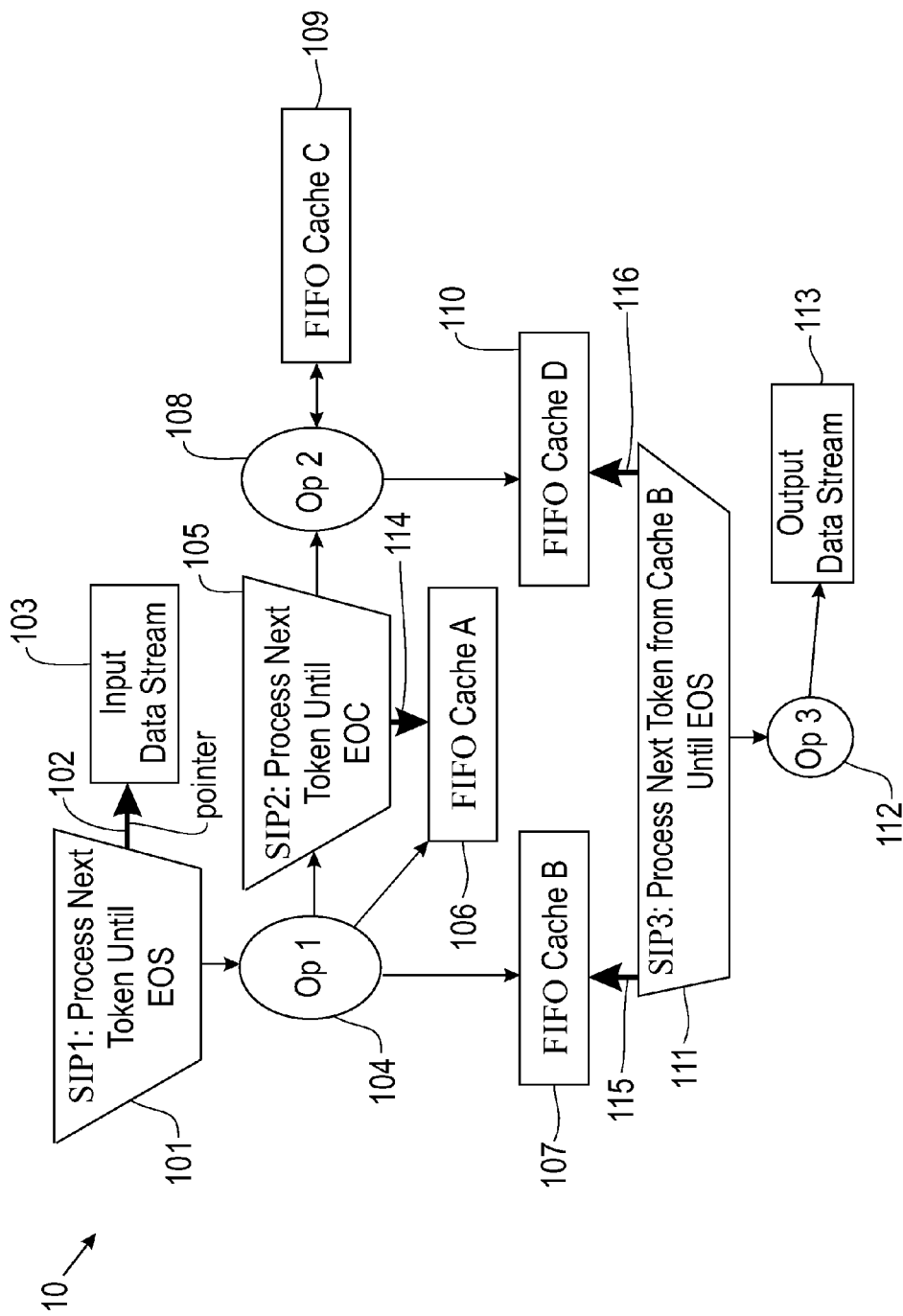
FIG. 1 illustrates a block diagram of a multi-threaded solution in accordance with exemplary embodiments.

The detailed description explains the preferred embodiments of the invention, together with advantages and features, by way of example with reference to the drawings.

DETAILED DESCRIPTION

Exemplary embodiments include methods, system and computer program products that implement a standard set of parameters for a Simple Interface for Processing of data streams (SIP). A data stream operator is defined, which can accept at least one SIP as input, host multiple FIFO caches that act as data streams, and also provide any number of SIPs as calls or signals to any number of other operators.

In exemplary embodiments, in order to achieve maximal ease of maintenance the methods, systems and computer program products described herein implement single threaded processes, relying on the call mechanism for synchronization. Performance can also be improved in a multiprocessing environment by adding synchronizing special tokens to the data stream and operating in multithreaded concurrent processing mode.

In exemplary embodiments, the parameters of the SIP consist of at least one pointer to at least one data stream and information about how to process each data stream. The information may specify a fixed number of characters or tokens to be processed once, a fixed number of characters or tokens to be processed iteratively until a condition is met, or a fixed number of characters or tokens to be processed iteratively forever.

In exemplary embodiments, in a single threaded mode, each data stream is an object that responds to a READ request by immediately either returning a "data source empty" condition or removing from itself and returning to the requester its next token. (Here, token is to be understood in a generic sense, ranging from next specified number of characters to next specified fixed number of strings of characters terminated by white space.)

In further exemplary embodiments, in multi-threaded mode, a data stream responds to a READ request by waiting until it has a next token and then removing that next token from itself and returning that next token to the requester. The organization of concurrent data stream processing into a collection of data stream operators that communicate via SIPs solves some of the complexity problem with a simple standard interface.

In exemplary embodiments, the methods, systems and computer program products described herein implement synchronizing tokens, the synchronous READ that waits, and the passing of SIPs rather than directly composing the operators sequentially or with split and merged data streams. The SIP gives an extra level of control that makes it possible for one operator to determine at run time the size of variable length string to be read and processed by another operator.

Furthermore, the single threaded solution includes the use of single threading together with the passing of SIPs, and the wait-free READ.

In exemplary embodiments, the methods, system and computer program products described herein provide the ability to process a data stream that is a specified as a network of multiple operators, each operator taking as input a set of input parameters, including at least one pointer to a data stream source and information about how to process the data stream, and each operator producing as output one or more sets of output parameters, each set of output parameters including a pointer to a data stream source and information about how to process the data stream. In exemplary embodiments, the processing can further be extended by one or more caches, each cache acting as a FIFO data stream source. In addition, the operators call each other in a single threaded mode, so that processing takes place one operator at a time combined with a wait-free READ. In exemplary embodiments, each set of input parameters and each set of output parameters includes a fixed number of characters or tokens associated with at least one data stream pointer. In addition, there can be one original and one final operator, the input parameters of the original operator including one pointer pointing to an original data stream source, and the final operator including only one set of output parameters and the output pointer to a data stream source points to an internal data store of the final operator. Furthermore, the output data stream can include annotation tokens (single strings with no white space, designated as annotations and reporting some feature of a character string) that follow immediately the string they annotate. In exemplary embodiments, the operators call each other in multi threaded mode via signals and synchronize via special tokens that do not appear in the original input data stream and via a READ operation that waits indefinitely for data. Furthermore, each annotation immediately follows the string it annotates in the output stream.

In exemplary embodiments, the methods, system and computer program products described herein provide the ability to process a data stream by applying multiple operators to the data stream, at least one of the operators taking as input a plurality of sets of input parameters, each set of input parameters including a pointer to a data stream source and information about how to process the data stream, and each operator producing as output at least one set of output parameters, each set of output parameters including a pointer to a data stream source and information about how to process the data stream. The methods, system and computer program products described herein provide the ability to further annotate the data stream. In addition, each set of input parameters and each set of output parameters includes a fixed positive window size and a non-negative amount to slide the window from the last position, the window and slide parameters defining the next chunk of data to be processed from the corresponding data stream and an operation by one of the operators can include retrieving the next chunk for each of its sets of input parameters, performing digital processing operations on the set of chunks, producing sets of output parameters, and adding data to one or more internal data stores and acting as one or more data stream sources. In exemplary embodiments, there is one original and one and final operator, the original operator has only a fixed set of input parameters with the pointer pointing to an original data stream source, and the final operator has only one set of output parameters and the output pointer to a data stream source points to an internal data store of the final operator. In addition, the internal data store of the final operator holds a stream of annotations corresponding to the original data stream.

For illustrative purposes, an example of a chemical names annotator running on patent documents that have been scanned and subjected to optical character recognition is described. The annotator is to append a valid chemical name annotation token after each recognized chemical name within the data stream.

A multithreaded solution for improved performance at the cost of the use of special synchronizing tokens that do not appear in the input data stream and of significant additional complexity is first described.

The multithreaded solution implements special synchronizing tokens EOS and EOC that do not appear in input data stream. In addition, the operation of reading a token from a data stream (or FIFO cache) waits for a next token from the data source and then removes that token from the data source before returning with it. FIG. 1 illustrates a block diagram 10 of a multi-threaded solution in accordance with exemplary embodiments. FIG. 1 includes sets of parameters 101, 105, 111 and data stream pointers 102 (in 101), 114 (in 105), 115 and 116 (in 111), operators 104, 108, 112 and internal storage objects 106, 107, 109, 110, 113. In exemplary embodiments an input 101 is input data to Op1 (104). In addition, the input data stream pointer for parameter 101 is the pointer 102. Furthermore, the pointer 1002 points to initial input data stream 103. The operator 104 adds data to two internal storage objects 106, 107. The internal storage object 106 acts as a data stream for Op2 108. The parameter 105 is output from Op1 1004 and input to Op2 1008, which then adds data to two internal storage objects 109, 1010. The internal storage object 109 acts as a data stream for Op2 108. The internal storage objects 107, 110 act as data streams for Op3 112. The parameter 111 is input to the operator 112, which adds data to one internal storage object 113, which acts as final output data stream.

Op1 follows the following rules:
On input of SIP1,
    Let t be null;
    Until t is EOS, do
        Read token t from input data stream;
        If t is not a potential chemical fragment,
            Write t to Cache B;
            Write EOC to Cache A;
            Send SIP2 to Op 2;
If t is a potential chemical fragment,
    Write t to both Cache A and Cache B,
    Op 1 uses a set of filters including an English dictionary to determine whether a token is a potential chemical fragment.
    Furthermore, Op 2 follows the following rules:
On receipt of SIP2,
    Let t be null;
    While t is not EOC, do
        Read token t from Cache A;
        Write t to both Cache C and Cache D;
    Process the contents of Cache C;
        If the contents of Cache C, after processing, is recognized as a valid chemical compound,
            Write the name of this compound as an annotation token to Cache D Op 2 uses a set of processes including removing all white space (destroying the tokenization) in order to determine whether the contents of Cache C is a valid chemical compound. Note that each receipt of SIP2 results in the removal of exactly one EOC token from Cache A. The EOC token tells Op 2 when to process the contents of Cache C.

In addition, Op 3 follows the set of rules:
On receipt of SIP3,
    Let b be null;
    While b is not EOS do:
        Read token b from Cache B,
        Read token d from Cache D,
        If d is neither b nor EOC,
            Output d,
            Read token d from Cache D,
            Output b.

Using the operators depicted above, the processing of the following sentence is illustrated:

"The compound of claim wherein said compound is 2-(Bicyclo[2.2.1]hept-5-en-2-ylamino)-5-[2-(4-chloro-3-methylphenoxy)ethyl]-1,3-thiazol-4(5H)-one for use as a drug. EOS"

Op 1 passes the input data stream through to Cache B, token, by token.

The first token in the input stream is read. "The" is found in the dictionary, EOC is placed in cache A and read cache A to EOC is sent to the second operator.

The second token is read from the input stream. "compound" is found in the dictionary, EOC is placed in cache A and read cache A to EOC is sent to the second operator.

The third token is read from the input stream. "of" is found in the dictionary, EOC is placed in cache A and read cache A to EOC is sent to the second operator.

The fourth token is read from the input stream. "claim" is found in the dictionary, EOC is placed in cache A and read cache A to EOC is sent to the second operator.

The fifth token is read from the input stream. "wherein" is found in the dictionary, EOC is placed in cache A and read cache A to EOC is sent to the second operator.

The sixth token is read from the input stream. "said" is found in the dictionary, EOC is placed in cache A and read cache A to EOC is sent to the second operator.

The seventh token is read from the input stream. "compound" is found in the dictionary, EOC is placed in cache A and read cache A to EOC is sent to the second operator.

The eighth token is read from the input stream. "is" is found in the dictionary, EOC is placed in cache A and read cache A to EOC is sent to the second operator.

The ninth token is read from the input stream. "2-(Bicyclo [2.2" is not found in the dictionary, passes through the pattern filter and regular expression or bigram filters and then is written as the first entry in cache A.

The tenth token is read from the input stream. "1]hept-5-en-2-ylamino)" is not found in the dictionary, passes through the pattern filter and regular expression or bigram filters and then is written as the second entry in cache A.

The eleventh token is read from the input stream. "-5-[2-(4-chloro-3-methylphenoxy)ethyl]-1," is not found in the dictionary, passes through the pattern filter and regular expression or bigram filters and then is written as the third entry in cache A.

The twelfth token is read from the input stream. "3-thiazol-4(5H)-one" is not found in the dictionary, passes through the pattern filter and regular expression or bigram filters and then is written as the fourth entry in cache A.

The thirteenth token is read from the input stream. "for" is found in the dictionary, EOC is placed in cache A and read cache A to EOC is sent to the second operator.

Meanwhile the second operator passes cache A through to cache D, token by token. When it receives SIP2 with non EOC tokens in cache A, it moves each of the non EOC tokens to cache C. It then removes all white space from Cache C, passes the result through a length filter, makes changes to the result for OCR correction, leading and trailing punctuation corrections and then filters for length, dictionary, numbers and N-grams, which results with the final token "2-(Bicyclo-5-[2.2.1]hept-5-en-2-ylamino)[2-(4-chloro-3-methylphenoxy)ethyl]-1)3-thiazol-4(5H)-one)" which is written to Cache D as one annotation token. The contents of Cache B and Cache D are merged by Op 3.

Note the complexity involved in synchronizing for the merger so that the annotation is written immediately after the fragments from which it was recognized. This complexity is a source of maintenance difficulty. When the highest performance is not imperative, the single threaded solution is preferred.

Figure 2:
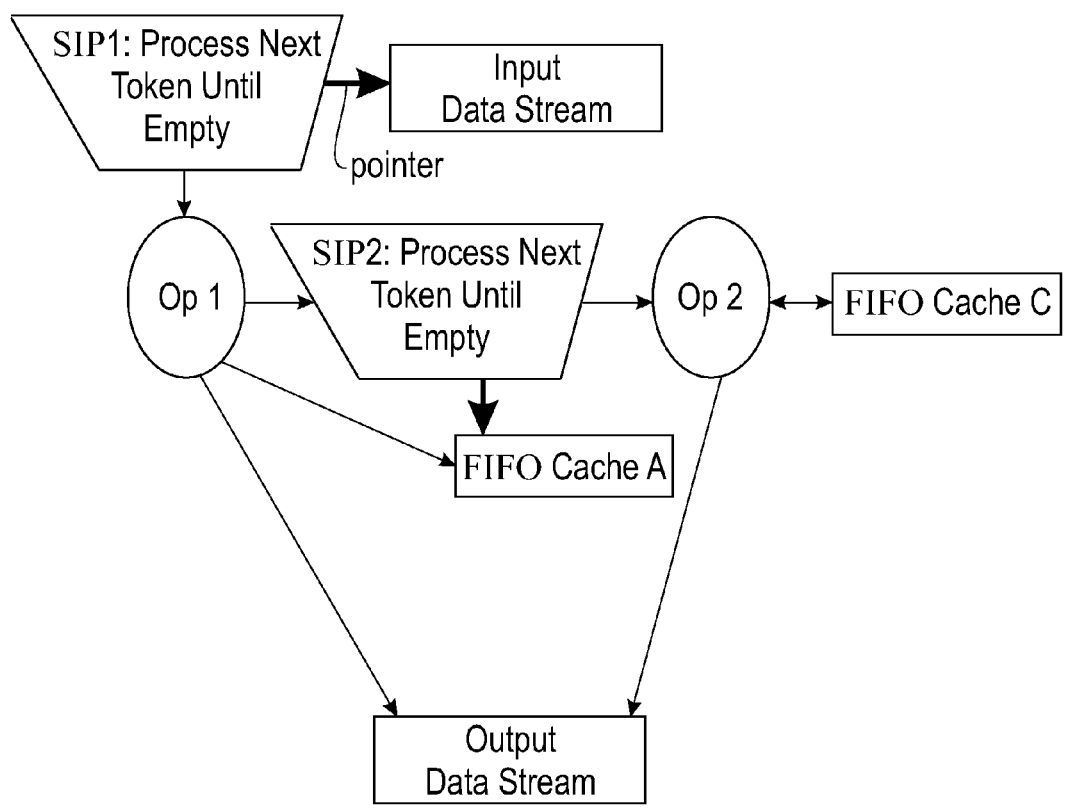
FIG. 2 illustrates a block diagram of a single-threaded solution in accordance with exemplary embodiments.

In the single-threaded solution, no special tokens are implemented. Read token either returns immediately with a condition stating that the data source is empty or removes one token from the data source and returns with that token. SIP is passed by a call that transfers the single thread to the called operator until it returns to the calling operator. FIG. 2 illustrates a block diagram 20 of a single-threaded solution in accordance with exemplary embodiments.

Op1 follows the following rules:
On input of SIP1,
    Read token t from input data stream;
    While data source not empty do
        Output t;
        If t is not a potential chemical fragment,
            Call Op 2 with SIP2;
        Else
            Write t to Cache A;
        Read token t from input data stream;
    Furthermore, Op2 follows the following rules:
On input of SIP2,
Read token t from Cache A
While data source not empty, write t to Cache C;

If the contents of Cache C, after processing, is recognized as a valid chemical compound, Output the name of this compound as an annotation token;

Return;

Using the two operators depicted above, the single threaded processing is implemented on the following sentence:

"The compound of claim wherein said compound is 2-(Bicyclo[2.2.1]hept-5-en-2-ylamino)-5-[2-(4-chloro-3-methylphenoxy)ethyl]-1,3-thiazol-4(5H)-one for use as a drug."

The first operator passes the input data stream to the output data stream (pausing while it calls operator 2).

The first token in the input stream is read. "The" is found in the dictionary, the second operator is called to read the cache, which is empty so the second operator returns.

The second token is read from the input stream. "compound" is found in the dictionary, which signals the second operator to read the cache which is empty.

The third token is read from the input stream. "of" is found in the dictionary, which signals the second operator to read the cache which is empty.

The fourth token is read from the input stream. "claim" is found in the dictionary, which signals the second operator to read the cache which is empty.

The fifth token is read from the input stream. "wherein" is found in the dictionary, which signals the second operator to read the cache which is empty.

The sixth token is read from the input stream. "said" is found in the dictionary, which signals the second operator to read the cache which is empty.

The seventh token is read from the input stream. "compound" is found in the dictionary, which signals the second operator to read the cache which is empty.

The eighth token is read from the input stream. "is" is found in the dictionary, which signals the second operator to read the cache which is empty.

The ninth token is read from the input stream. "2-(Bicyclo[2.2" is not found in the dictionary, passes through the pattern filter and regular expression or bigram filters and then is written as the first entry in the cache.

The tenth token is read from the input stream. "1]hept-5-en-2-ylamino)" is not found in the dictionary, passes through the pattern filter and regular expression or bigram filters and then is written as the second entry in the cache.

The eleventh token is read from the input stream. "-5-[2-(4-chloro-3-methylphenoxy)ethyl]-1," is not found in the dictionary, passes through the pattern filter and regular expression or bigram filters and then is written as the third entry in the cache.

The twelfth token is read from the input stream. "3-thiazol-4(5H)-one" is not found in the dictionary, passes through the pattern filter and regular expression or bigram filters and then is written as the fourth entry in the cache.

The thirteenth token is read from the input stream. "for" is found in the dictionary, which signals the second operator to process the cache. The second operator, concatenates the entries removing any spaces and passes the result through a length filter, makes changes to the result for OCR correction, leading and trailing punctuation corrections and then filters for length, dictionary, numbers and N-grams, which results with the final token:

Begin Annotation {2-(Bicyclo-5-[2.2.1]hept-5-en-2-ylamino)[2-(4-chloro-3-methylphenoxy)ethyl]-1)3-thiazol-4(5H)-one)} End Annotation ]-1)3-thiazol-4(5H)-one)" which is output to the stream before the second operator returns and thus before the first operator adds "for" to the output stream.

The first operator returns when it reaches the data source empty condition.

Figure 3:
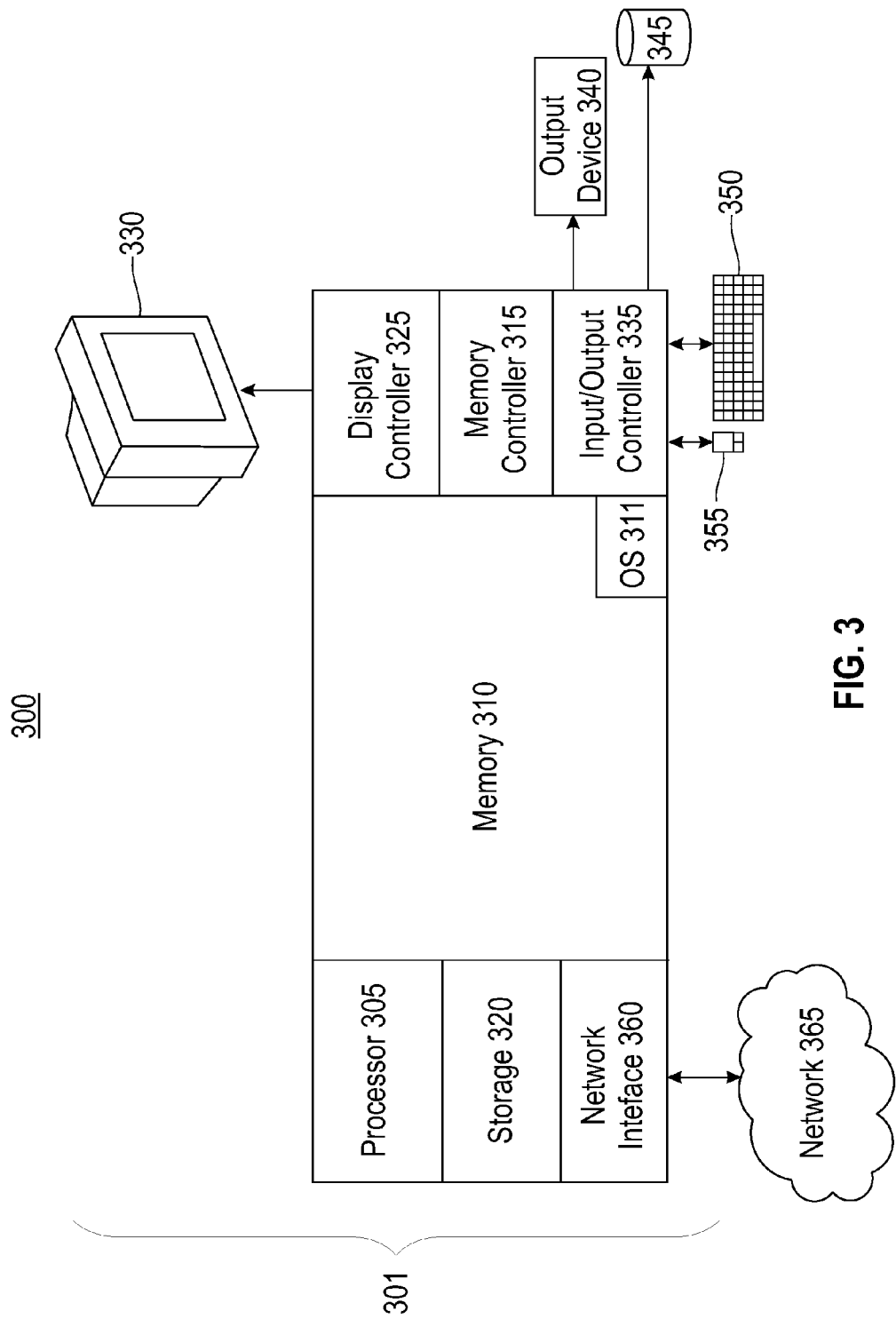
FIG. 3 illustrates an exemplary embodiment of a system for simplifying complex data stream problems involving feature extraction from noisy data.

FIG. 3 illustrates an exemplary embodiment of a system 300 for simplifying complex data stream problems involving feature extraction from noisy data. The methods described herein can be implemented in software (e.g., firmware), hardware, or a combination thereof. In exemplary embodiments, the methods described herein are implemented in software, as an executable program, and executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CDROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the data processing methods described herein in accordance with exemplary embodiments and a suitable operating system (OS) 311. The operating system 311 essentially controls the execution of other computer programs, such the data processing systems and methods described herein, and provides scheduling, input-output control, file and data management, memory management, and communication control and related services.

The data processing methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the data processing methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The data processing methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method. In the context of this document, a computer readable medium is an electronic, magnetic, optical, or other physical device or means that can contain or store a computer program for use by or in connection with a computer related system or method. The data processing methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the data processing methods are implemented in hardware, the data processing methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for extracting and analyzing a structure from a data stream received in a processor, the method comprising:
  receiving the data stream in the processor, the data stream having a first part and a second part, wherein the data stream includes a plurality of tokens, each of the tokens having an end of character, and the data stream having an end of string;

defining a first, second, third and fourth cache, coupled to the processor;
for each of the plurality of tokens of the first part of the data stream, until the end of string is read:
  reading the token;
  determining if the token is part of the structure;
  in response to the token being part of the structure, writing the token to the second cache, writing the end of character to the first cache;
  while the token is not the end of character in the second part of the data stream:
    reading the token from the first cache;
    writing the token to the third and fourth caches;
  if the contents of the third cache is the structure, writing the structure to the forth cache;
  in response to the token not being part of the structure, writing the token to the first and second caches;
  while the token in the second cache is not the end of string;
  reading the token from the second cache;
    reading the token from the fourth cache;
    if neither the token from the forth cache is not equal to the token from the second cache or equal to the end of character, outputting the token from the fourth cache and reading the token from the fourth cache; and
    outputting the token from the second cache; and
    merging the tokens in the second and fourth caches to identify the structure,
  wherein the data stream is processed in at least one of a single threaded mode and a multi-threaded mode,
  wherein in the single threaded mode, each data stream is an object that responds to a READ request by immediately either returning a "data source empty" condition or removing from the object and returning to a requester a next token, wherein the next token can be at least one of a specified number of characters and a next specified fixed number of strings of characters terminated by a white space,
  wherein, in the single threaded mode, the read token performs at least one of returning immediately with a condition that a data source is empty, and removing one token from the data source and returning with the removed token;
  wherein in the multi-threaded mode, the data stream responds to the READ request by waiting until the data stream has a next token and then removing the next token from the data stream and returning the next token to the requester wherein the multiple operators in the multi-threaded mode make calls via signals and synchronize via special tokens independent of the data stream and via the READ request that waits indefinitely for the data stream,
  wherein, in the multithreaded mode, the end of string, not present in the data stream, is added to the end of a string in the data stream and tokens are read until a character in the string is the end of string,
  wherein, in the multithreaded mode, if the token is present in a dictionary, the end of character not present in the data stream is added at an end of each character in the string, and characters are read while each character in the string is not the end of character, and wherein the end of character is passed to a next character, and if the token is not present in the dictionary, the token is passed to a next operator without the end of character, wherein the end of character is continuously passed to a next token in response to the token being present in the dictionary.

* * * * *